(12) United States Patent
Terrazas

(10) Patent No.: US 10,250,942 B2
(45) Date of Patent: *Apr. 2, 2019

(54) METHODS, APPARATUS AND ARTICLES OF MANUFACTURE TO DETECT SHAPES

(71) Applicant: The Nielsen Company (US), LLC, New York, NY (US)

(72) Inventor: Alejandro Terrazas, Santa Cruz, CA (US)

(73) Assignee: The Nielsen Company (US), LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/860,165

(22) Filed: Jan. 2, 2018

(65) Prior Publication Data

US 2018/0124456 A1     May 3, 2018

Related U.S. Application Data

(63) Continuation of application No. 13/797,010, filed on Mar. 12, 2013, now Pat. No. 9,866,900.

(51) Int. Cl.
*H04N 21/442* (2011.01)
*H04N 21/422* (2011.01)
(Continued)

(52) U.S. Cl.
CPC ....... *H04N 21/442* (2013.01); *G06K 9/00201* (2013.01); *G06K 9/00362* (2013.01);
(Continued)

(58) Field of Classification Search
CPC .............. G06K 9/6227; G06K 9/6278; G06K 9/00375; G06K 9/00221; G06K 2209/21;
(Continued)

(56) References Cited

U.S. PATENT DOCUMENTS 4,779,198 A    10/1988   Lurie
6,611,617 B1    8/2003   Crampton
(Continued)

OTHER PUBLICATIONS

United States Patent and Trademark Office, "Notice of Allowance," issued in connection with U.S. Appl. No. 13/797,010, dated Sep. 1, 2017, 7 pages.
(Continued)

*Primary Examiner* — Nathan J Flynn
*Assistant Examiner* — Cynthia M Fogg
(74) *Attorney, Agent, or Firm* — Hanley, Flight & Zimmerman, LLC

(57) ABSTRACT

Methods, apparatus, and articles of manufacture to detect shapes are disclosed. Example methods disclosed herein include determining a first likelihood of detection for a reference shape at a first distance from an image capturing device, and storing the reference shape in a first group of a plurality of groups in the database based on a comparison of the first likelihood of detection with a first threshold, the first group associated with the first distance. Disclosed examples also include selecting reference shapes of the first group to compare to an object outline detected in an image in response to a query, the query including a depth value associated with the detected object outline, the selecting of the reference shapes of the first group based on the depth value.

20 Claims, 9 Drawing Sheets

(51) Int. Cl.
  *H04N 21/4223* (2011.01)
  *G06K 9/00* (2006.01)
  *H04N 5/225* (2006.01)
  *H04N 5/33* (2006.01)

(52) U.S. Cl.
  CPC ............ *H04N 5/2258* (2013.01); *H04N 5/33* (2013.01); *H04N 21/4223* (2013.01); *H04N 21/42201* (2013.01); *H04N 21/44218* (2013.01)

(58) Field of Classification Search
  CPC ............ G06K 9/6215; G06K 9/00201; H04N 21/4223; H04N 21/442; G06T 7/20; G06T 7/204; G06T 7/2046; G06T 7/0051; G08B 13/19613; G01B 11/026
  USPC ........................................................ 725/12
  See application file for complete search history.

(56) References Cited

U.S. PATENT DOCUMENTS

| | | | |
|---|---|---|---|
| 6,671,405 B1 * | 12/2003 | Savakis | G06K 9/00234 |
| | | | 358/527 |
| 7,091,988 B2 | 8/2006 | Hori et al. | |
| 7,257,236 B2 * | 8/2007 | Yukhin | G06K 9/00201 |
| | | | 348/135 |
| 7,348,963 B2 | 3/2008 | Bell | |
| 7,961,174 B1 | 6/2011 | Markovic et al. | |
| 8,022,951 B2 | 9/2011 | Zhirkov et al. | |
| 2002/0081033 A1 | 6/2002 | Stentiford | |
| 2006/0062429 A1 | 3/2006 | Ramaswamay et al. | |
| 2007/0097265 A1 | 5/2007 | Yoshikawa et al. | |
| 2009/0284594 A1 | 11/2009 | Mitsuhashi | |
| 2010/0290698 A1 | 11/2010 | Freedman et al. | |
| 2011/0034176 A1 | 2/2011 | Lord et al. | |
| 2011/0244919 A1 | 10/2011 | Aller et al. | |
| 2011/0279368 A1 | 11/2011 | Klein et al. | |
| 2012/0087592 A1 * | 4/2012 | Kim | G06K 9/6255 |
| | | | 382/218 |
| 2013/0061258 A1 | 3/2013 | Takaya et al. | |
| 2013/0176401 A1 | 7/2013 | Monari et al. | |
| 2014/0161305 A1 | 6/2014 | Lee et al. | |
| 2014/0254880 A1 | 9/2014 | Srinivasan et al. | |
| 2014/0282644 A1 | 9/2014 | Terrazas | |

OTHER PUBLICATIONS

United States Patent and Trademark Office, "Non-final Office Action," issued in connection with U.S. Appl. No. 13/797,010, dated May 9, 2017, 6 pages.

United States Patent and Trademark Office, "Final Office Action," issued in connection with U.S. Appl. No. 13/797,010, dated Jul. 1, 2016, 19 pages.

United States Patent and Trademark Office, "Non-final Office Action," issued in connection with U.S. Appl. No. 13/797,010, dated Feb. 24, 2016, 16 pages.

United States Patent and Trademark Office, "Final Office Action," issued in connection with U.S. Appl. No. 13/797,010, dated May 5, 2014, 10 pages.

United States Patent and Trademark Office, "Non-final Office Action," issued in connection with U.S. Appl. No. 13/797,010, dated Oct. 15, 2013, 7 pages.

* cited by examiner

| TYPE OF SHAPE | DISTANCE (ft) | REFERENCE SHAPE GROUPS |
|---|---|---|
| STANDING PERSON | 0.5 – 3.0 | RS1784a, RS4874t, RS985n... |
| | 3.1 – 6.0 | RS5378j, RS2269i, RS7741m... |
| | 6.1 – 8.0 | RS4587p, RS4561r, RS1475g... |
| | 8.1 – 10.0 | RS1784e, RS1475g, RS4376u... |
| | 10.1 – 13.0 | RS9467l, RS5574v, RS6378k... |
| SITTING PERSON | 0.5 – 3.0 | RS8457g, RS2347e, RS2547t... |
| | 3.1 – 6.0 | RS7845g, RS6322q, RS2174a... |
| | 6.1 – 8.0 | RS4731b, RS9714h, RS2587f... |
| | 8.1 – 10.0 | RS1249b, RS3895p, RS8747x... |
| | 10.1 – 13.0 | RS4671o, RS9632w, RS7314y... |
| PROFILE OF HUMAN HEAD | 0.5 – 3.0 | RS7458s, RS23741h, RS3761m... |
| | 3.1 – 6.0 | RS4512j, RS7746z, RS9673t... |
| | 6.1 – 8.0 | RS6478r, RS2341h, RS8796y... |
| | 8.1 – 10.0 | RS2587e, RS1943g, RS5747k... |
| | 10.1 – 13.0 | RS3575q, RS5550h, RS6704f... |
| PERSON/CHAIR COMBINATION | 0.5 – 3.0 | RS0754u, RS0543u, RS0879n... |
| | 3.1 – 6.0 | RS7845g, RS63222q, RS04778d... |
| | 6.1 – 8.0 | RS08754, RS0478a, RS0256g... |
| | 8.1 – 10.0 | RS0487p, RS02346t, RS0733f... |
| | 10.1 – 13.0 | RS04237s, RS0743e, RS0253n... |

FIG. 5

METHODS, APPARATUS AND ARTICLES OF MANUFACTURE TO DETECT SHAPES

This patent arises from a continuation of U.S. patent application Ser. No. 13/797,010, filed Mar. 12, 2013, now U.S. Pat. No. 9,866,900. U.S. patent application Ser. No. 13/797,010 is hereby incorporated herein by reference in its entirety. Priority to U.S. patent application Ser. No. 13/797,010 is claimed.

FIELD OF THE DISCLOSURE

Field of the Disclosure

This disclosure relates generally to monitoring systems and, more particularly, to methods, apparatus and articles of manufacture to detect shapes.

BACKGROUND

Audience measurement of media (e.g., broadcast television and/or radio, stored audio and/or video played back from a memory such as a digital video recorder or a digital video disc, a webpage, audio and/or video media presented (e.g., streamed) via the Internet, a video game, etc.) often involves collection of media identifying data (e.g., signature(s), fingerprint(s), code(s), tuned channel identification information, time of exposure information, etc.) and people data (e.g., user identifiers, demographic data associated with audience members, etc.). The media identifying data and the people data can be combined to generate, for example, media exposure data indicative of number(s) and/or type(s) of people that were exposed to specific piece(s) of media.

In some audience measurement systems, the people data is collected by capturing a series of images of a media exposure environment (e.g., a television room, a family room, a living room, a bar, a restaurant, etc.) and analyzing the images to determine, for example, an identity of one or more persons present in the media exposure environment, a number of people present in the media exposure environment during one or more times and/or periods of time, etc. The collected people data can be correlated with media detected as being presented in the media exposure environment to provide exposure data (e.g., ratings data) for that media.

BRIEF DESCRIPTION OF THE DRAWINGS

FIG. 5 is an example data structure associated with the example reference shape manager of FIG. 4.

DETAILED DESCRIPTION

Figure 1:
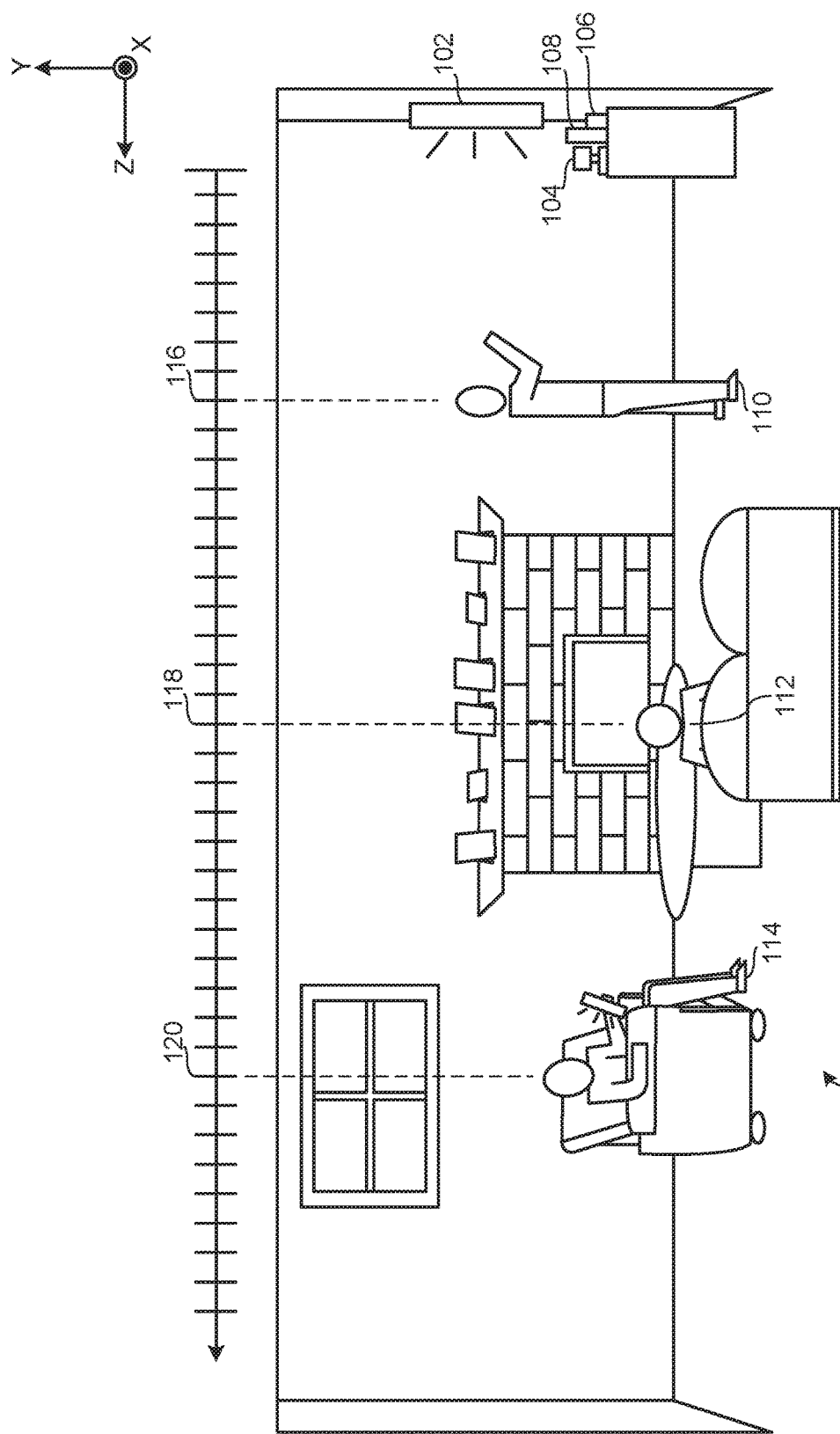
FIG. 1 is an illustration of an example media exposure environment including an example meter constructed in accordance with teachings of this disclosure.

In some audience measurement systems, people data is collected for a media exposure environment (e.g., a television room, a family room, a living room, a bar, a restaurant, an office space, a cafeteria, etc.) by capturing a series of images of the environment and analyzing the images to determine, for example, presence of one or more people in the media exposure environment, an identity of one or more persons present in the media exposure environment, a number of people present in the media exposure environment during one or more times and/or periods of time, a gesture made by a person in the media exposure environment, a behavior or activity being performed by a person in the media exposure environment, an engagement level of a person with media being presented in the media exposure environment, etc. The people data can be correlated with, for example, media identifying information corresponding to detected media to provide exposure data for that media. For example, an audience measurement entity (e.g., The Nielsen Company (US), LLC) can calculate ratings for a first piece of media (e.g., a television program) by correlating data collected from a plurality of panelist sites with the demographics of the panelist. For example, in each panelist site in which the first piece of media is detected in the monitored environment at a first time, media identifying information for the first piece of media is correlated with presence information detected in the environment at the first time. The results from multiple panelist sites are combined and/or analyzed to provide ratings representative of exposure of a population as a whole.

Some audience measurement systems employ a recognition system to gather information from an environment. Recognition systems include device(s), application(s) and/or algorithm(s) tasked with identifying and/or detecting aspect(s) of data (e.g., image data and/or audio data) representative of an environment and/or occupants of the environment. Known recognition applications, systems, and devices include, for example, surveillance systems, consumer behavior monitors deployed in shopping centers, audience measurement devices, video games, etc. While described below in the context of recognizing people and/or aspects of people, example methods, apparatus, and/or articles of manufacture disclosed herein can be utilized in connection with additional or alternative recognition systems that detect, identify, and/or recognize additional or alternative types of objects. Further, while described below in the context of audience measurement, example methods, apparatus, and/or articles of manufacture disclosed herein can be utilized in connection with additional or alternative environments.

Recognition systems typically capture images of the monitored environment and analyze the images to, for example, count a number of people present in the monitored environment at certain times, identify people present in the environment, identify behavior of a person, measure an engagement level of a person with media, and/or identify a gesture made by a person. Some known recognition systems, such as those tasked with determining that a portion of image data represents a certain object (e.g., a person), detect object outlines in image data. In some instances, the detected object outlines are referred to as blobs that are detected from the image data. Such recognition systems compare the detected object outlines to reference shapes known to correspond to the sought after object(s). As used herein, a reference shape is an outline known to correspond to a particular object (e.g., a profile view of a person's upper torso, a person behaving in a particular manner such as sleeping, jumping, sitting, talking, etc.) and/or combination of objects (e.g., a person sitting on a couch).

Some recognition systems suffer from having to compare the detected object outlines to a very large number of known reference shapes when using the object outlines to identify the corresponding objects. Libraries of reference shapes against which the detected object outlines are tested tend to be massive. In some instances, the recognition system tests millions of reference shapes against a single piece of image data. Executing millions of comparisons is computationally expensive and time consuming. Moreover, comparing the image data (e.g., detected object outlines) to large numbers of reference shapes often results in an unacceptably high number of false positives. False positives can lead to, for example, an inaccurate tally of people for individual frames. An inaccurate tally of people in a frame can negatively affect the accuracy of media exposure data generated using the tally. For example, an audience measurement system counting the people in a room may also be collecting media identifying information to identify media being presented (e.g., aurally and/or visually) in the room. With the identification of the media and the number of people in the room at a given date and/or time, the audience measurement system can indicate how many people were exposed to the specific media and/or associate the demographics of the people with the specific exposure. Such data from many such locations can be used to determine characteristics of the audience for the specific media. For instance, an audience measurement entity (e.g., The Nielsen Company (US), LLC) can calculate ratings for a piece of media detected in an environment by correlating presence information detected in the environment at times corresponding to a detection of the piece of media. If people are not detected or recognized as people, the exposure data for the identified media may be under counted (e.g., the media is credited with fewer viewers/listeners than had actually been exposed to the media). Alternatively, if false positives are detected, the exposure data for the identified media may be overstated (e.g., the media is credited with more viewers/listeners than had actually been exposed to the media).

Example methods, apparatus, and articles of manufacture disclosed herein reduce the number of comparisons executed by recognition systems monitoring an environment for particular shapes. As described in detail below, examples disclosed herein use depth information associated with a detected object outline to reduce the number of reference shapes against which the detected object outline is compared. The depth information used by examples disclosed herein represents a distance between a source of the image data, such as an image capturing device, and the detected object outline. The depth information is obtained and/or calculated via, for example, a depth sensor associated with and/or integrated with the image capturing device. Examples disclosed herein recognize that object outlines detected at certain distances from the corresponding image capturing device are not likely to match certain reference shapes of a reference shape collection (e.g., reference shape library). That is, examples disclosed herein recognize that a first object outline associated with an object located a first distance away from the image capturing device is not likely to match reference shapes that are typically only detected for objects located a second, different (e.g., greater or lesser) distance away from the image capturing device.

For instance, examples disclosed herein recognize that larger reference shapes are unlikely to be found in connection with objects located at greater distances from the image capturing device. Similarly, examples disclosed herein recognize that smaller reference shapes are likely to be found in connection with objects located at greater distances from the image capturing device. Additionally, examples disclosed herein recognize that smaller reference shapes are unlikely to be found in connection with objects located at short distances from the image capturing device. Similarly, examples disclosed herein recognize that larger reference shapes are likely to be found in connection with objects located at greater distances from the image capturing device. Moreover, examples disclosed herein recognize that midsize reference shapes are likely to be found in connection with objects located at mid-range distances from the image capturing device.

Accordingly, examples disclosed herein select a set of candidate reference shapes from a library of known reference shapes for comparison to a particular detected object outline based on depth information associated with the particular detected object outline. When the object associated with the particular detected object outline is located a first distance away from the image capturing device, examples disclosed herein select a first set of candidate reference shapes from the library. When the object associated with the particular detected object outline is located a second distance away from the image capturing device different than the first distance, examples disclosed herein select a second set of candidate reference shapes from the library different than the first set of candidate reference shapes.

To enable selection of the set of candidate reference shapes based on depth information, examples disclosed herein generate a data structure organized according to depth information and shape information. As described in detail below, examples disclosed herein generate the data structure such that a recognition system can use depth information to query the data structure. In particular, examples disclosed herein determine which reference shapes of a collection of reference shapes are likely to be detected at particular distances or ranges of distances. Examples disclosed herein group reference shapes likely to be detected at certain distances, thereby generating a data structure having a plurality of groups of reference shapes. Examples disclosed herein query the data structure using depth information associated with a detected object outline to select a group (or groups) of reference shapes from the data structure. Thus, the selected group includes a set of reference shapes typically found at a distance from a corresponding image capturing device at which the detected object outline was detected. In some examples, the organization and/or granularity of the data structure and/or the sets of candidate reference shapes depend on capabilities of the image capturing device to be used in connection with the data structure.

Thus, when an object outline is detected in image data, examples disclosed herein obtain a depth value(s) for the object outline and query the data structure using the depth information to arrive at a particular reference shape group having a set of candidate reference shapes. The corresponding set of candidate reference shapes represents a portion (e.g., percentage) of the entire library of reference shapes available for comparison. Examples disclosed herein compare the detected object outline to the set of candidate reference shapes rather than the entire library of reference shapes. In doing so, examples disclosed herein detect objects of interest in environments more efficiently and accurately than known systems.

FIG. 1 is an illustration of an example media exposure environment 100 including an information presentation device 102, an example image capturing device 104, and a meter 106 for collecting audience measurement data. In the illustrated example of FIG. 1, the information presentation device 102 is a television and the media exposure environment 100 is a room of a household (e.g., a room in a home of a panelist such as the home of a Nielsen family) that has been statistically selected to develop television ratings data for population(s)/demographic(s) of interest. In the illustrated example, one or more persons of the household have registered with an audience measurement entity (e.g., by agreeing to be a panelist) and have provided demographic information to the audience measurement entity as part of a registration process to enable associating demographics with viewing activities (e.g., media exposure). The example audience measurement system of FIG. 1 can be implemented in additional and/or alternative types of environments such as, for example, a room in a non-statistically selected household, a theater, a restaurant, a tavern, a retail location, an arena, etc. For example, the environment may not be associated with a panelist of an audience measurement study, but instead may simply be an environment associated with a purchased XBOX® and/or Kinect® system. In some examples, the example audience measurement system of FIG. 1 is implemented, at least in part, in connection with additional and/or alternative types of media presentation devices such as, for example, a radio, a computer, a tablet (e.g., an iPad®), a cellular telephone, and/or any other communication device able to present media to one or more individuals.

In the example of FIG. 1, the meter 106 is a software meter provided for collecting and/or analyzing the data from the image capturing device 104 and other media identification data collected as explained below. In some examples, the meter 106 is installed in a video game system 108 (e.g., by being downloaded to the same from a network, by being installed at the time of manufacture, by being installed via a port (e.g., a universal serial bus (USB) from a jump drive provided by the audience measurement company, by being installed from a storage disc (e.g., an optical disc such as a BluRay disc, Digital Versatile Disc (DVD) or CD (compact Disk), or by some other installation approach). Executing the meter 106 on the panelist's equipment is advantageous in that it reduces the costs of installation by relieving the audience measurement entity of the need to supply hardware to the monitored household. In other examples, rather than installing the software meter 106 on the panelist's consumer electronics, the meter 106 is a dedicated audience measurement unit provided by the audience measurement entity. In such examples, the meter 106 may include its own housing, processor, memory and software to perform the desired audience measurement functions. In such examples, the meter 106 is adapted to communicate with the image capturing device 104 via a wired or wireless connection. In some such examples, the communications are effected via the panelist's consumer electronics (e.g., via a video game console). In other examples, the image capturing device 104 is dedicated to audience measurement and, thus, no direct interaction (outside of monitoring outputs) with the consumer electronics owned by the panelist is involved.

As described in detail below, the example meter 106 of FIG. 1 utilizes the image capturing device 104 to capture a plurality of time stamped frames of visual image data (e.g., via a two-dimensional camera) and/or depth data (e.g., via a depth sensor) from the environment 100. In the example of FIG. 1, the image capturing device 104 of FIG. 1 is part of the video game system 108 (e.g., Microsoft® XBOX®, Microsoft® Kinect®). However, the example image capturing device 104 can be associated and/or integrated with a set-top box (STB) located in the environment 100, associated and/or integrated with the information presentation device 102, associated and/or integrated with a BluRay® player located in the environment 100, or can be a stand-alone device (e.g., a Kinect® sensor bar, a dedicated audience measurement meter, etc.), and/or otherwise implemented. In some examples, the meter 106 is integrated in an STB or is a separate standalone device and the image capturing device 104 is the Kinect® sensor or another sensing device.

In some examples, the audience measurement entity provides the image capturing device 104 to the household. In some examples, the image capturing device 104 is a component of a media presentation system purchased by the household such as, for example, a camera of the video game system 108 (e.g., Microsoft® Kinect®) and/or piece(s) of equipment associated with a video game system (e.g., a Kinect® sensor). In such examples, the image capturing device 104 may be repurposed and/or data collected by the image capturing device 104 may be repurposed for audience measurement. In some examples, the image capturing device 104 is integrated with the video game system 108. For example, the image capturing device 104 may collect image data (e.g., three-dimensional data and/or two-dimensional data) using one or more sensors for use with the video game system 108 and/or may also collect such image data for use by the meter 106. In some examples, the image capturing device 104 employs a first type of image sensor (e.g., a camera) to obtain image data of a first type (e.g., two-dimensional data) and a second type of image sensor (e.g., a depth sensor) to collect a second type of image data (e.g., three-dimensional data). In some examples, only one type of sensor is provided by the video game system 108 and a second sensor is added by an audience measurement system including the meter 106.

To capture depth data, the example image capturing device 104 of FIG. 1 uses a laser or a laser array to project a dot pattern into the environment 100. Depth data collected by the image capturing device 104 can be interpreted and/or processed based on the dot pattern and how the dot pattern lays onto objects of the environment 100. In the illustrated example of FIG. 1, the image capturing device 104 also captures two-dimensional image data via one or more cameras (e.g., infrared sensors) capturing images of the environment 100. In some examples, the image capturing device 104 also includes audio capturing component(s) such as, for example, a directional microphone. In some examples, the example image capturing device 104 of FIG. 1 is capable of detecting some or all of eye position(s) and/or movement(s), skeletal profile(s), pose(s), posture(s), body position(s), person identit(ies), body type(s), etc. of the individual audience members. In some examples, the data detected via the image capturing device 104 is used to, for example, detect and/or react to a gesture, action, or movement of the corresponding audience member. In the illustrated example of FIG. 1, the image capturing device 104 is placed adjacent the information presentation device 102 at a position for capturing image data of the environment 100. While the image capturing device 104 is positioned beneath the information presentation device 102 in the example of FIG. 1, the image capturing device 104 can be located at alternative locations (e.g., above the information presentation device 102, mounted to a wall at a side of the information presentation device 102, etc.).

Figure 2:
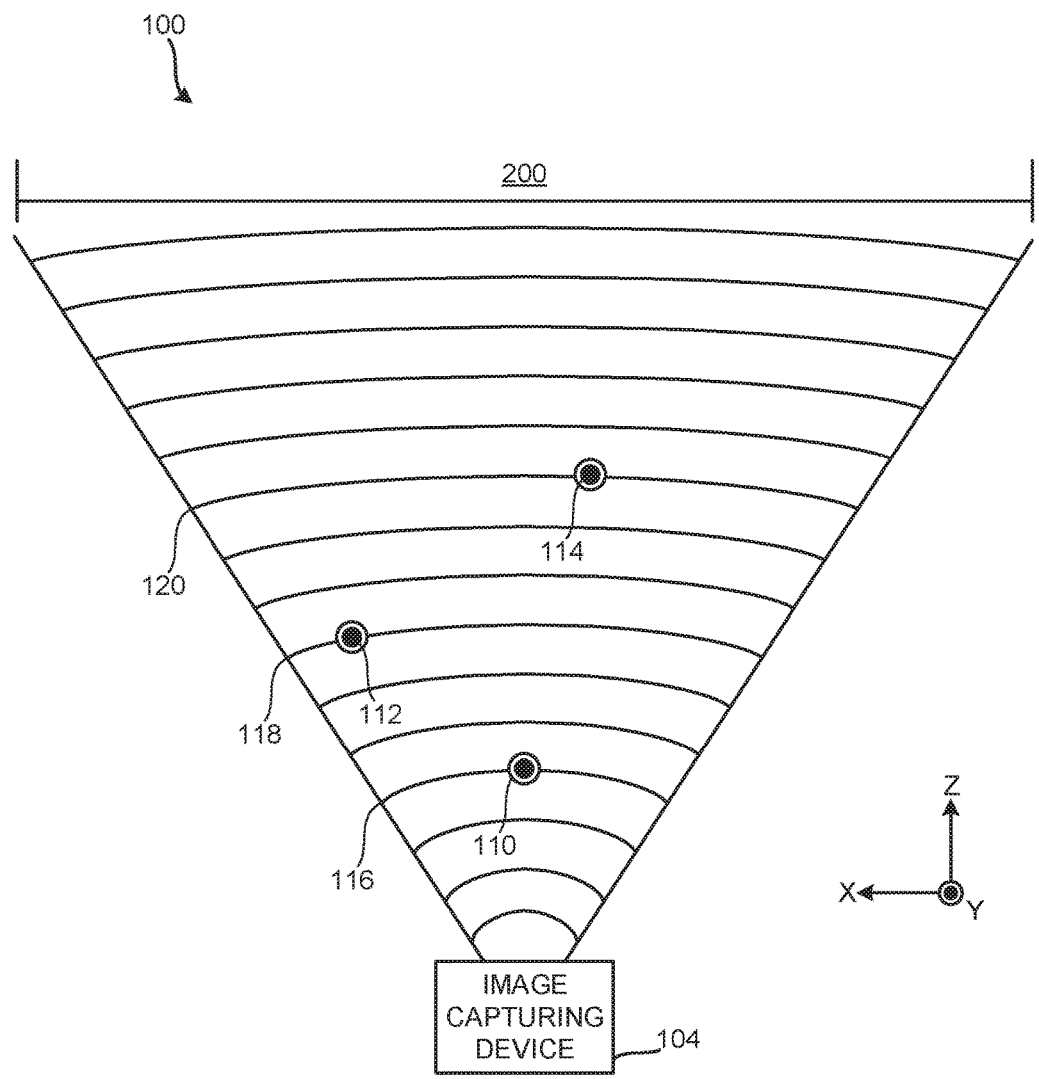
FIG. 2 is another illustration of the example media exposure environment of FIG. 1 from a different perspective than FIG. 1.

In the example shown in FIG. 1, first, second and third persons 110, 112 and 114 are present in the environment 100. In the illustrated example, the first person 110 is located at a first distance 116 (e.g., a depth value along the Z-axis in FIG. 1) from the image capturing device 104, the second person 112 is located a second distance 118 from the image capturing device 104 greater than the first distance 116, and the third person 114 is located a third distance 120 from the image capturing device 104 greater than the second distance 118. FIG. 2 illustrates the example media exposure environment 100 of FIG. 1 from a different perspective (e.g., a plan view). In particular, the example image capturing device 104 captures data across a field of view 200 illustrated in FIG. 2. As shown in the example of FIG. 2, the first person 110 of FIG. 1 is located at the first distance 116, the second person 112 of FIG. 1 is located at the second distance 118, and the third person 114 of FIG. 1 is located at the third distance 120. The locations of the persons 110-114 of FIGS. 1 and 2 each have an X-component, a Y-component, and a Z-component. The X-component of FIGS. 1 and/or 2 corresponds to a horizontal axis across the environment 100. The Y-component of FIGS. 1 and/or 2 corresponds to a vertical axis across the environment 100. The Z-component of FIGS. 1 and/or 2 corresponds to a depth value into the environment 100.

As described in detail below, the example meter 106 of FIG. 1 uses image data generated by the image capturing device 104 to detect object outlines at the locations shown in FIGS. 1 and 2 associated with the persons 110-114, selects a set of candidate reference shapes from a collection of reference shapes based on the depth value (e.g., Z-component) at the locations of the detected object outlines. The example meter 106 of FIG. 1 compares the detected object outlines to the selected set of candidate reference shapes to identify the object outlines as corresponding to, for example, a person and/or a combination of a person and a piece of furniture (e.g., a chair or couch). By using the depth values of the detected object outlines to select the set of candidate reference shapes, the example meter 106 of FIG. 1 significantly reduces the number of comparisons performed against the collection of reference shapes, thereby reducing computational cost, time spent analyzing the object outlines, and error rate(s) (e.g., of false positives).

Figures 3A, 3B:
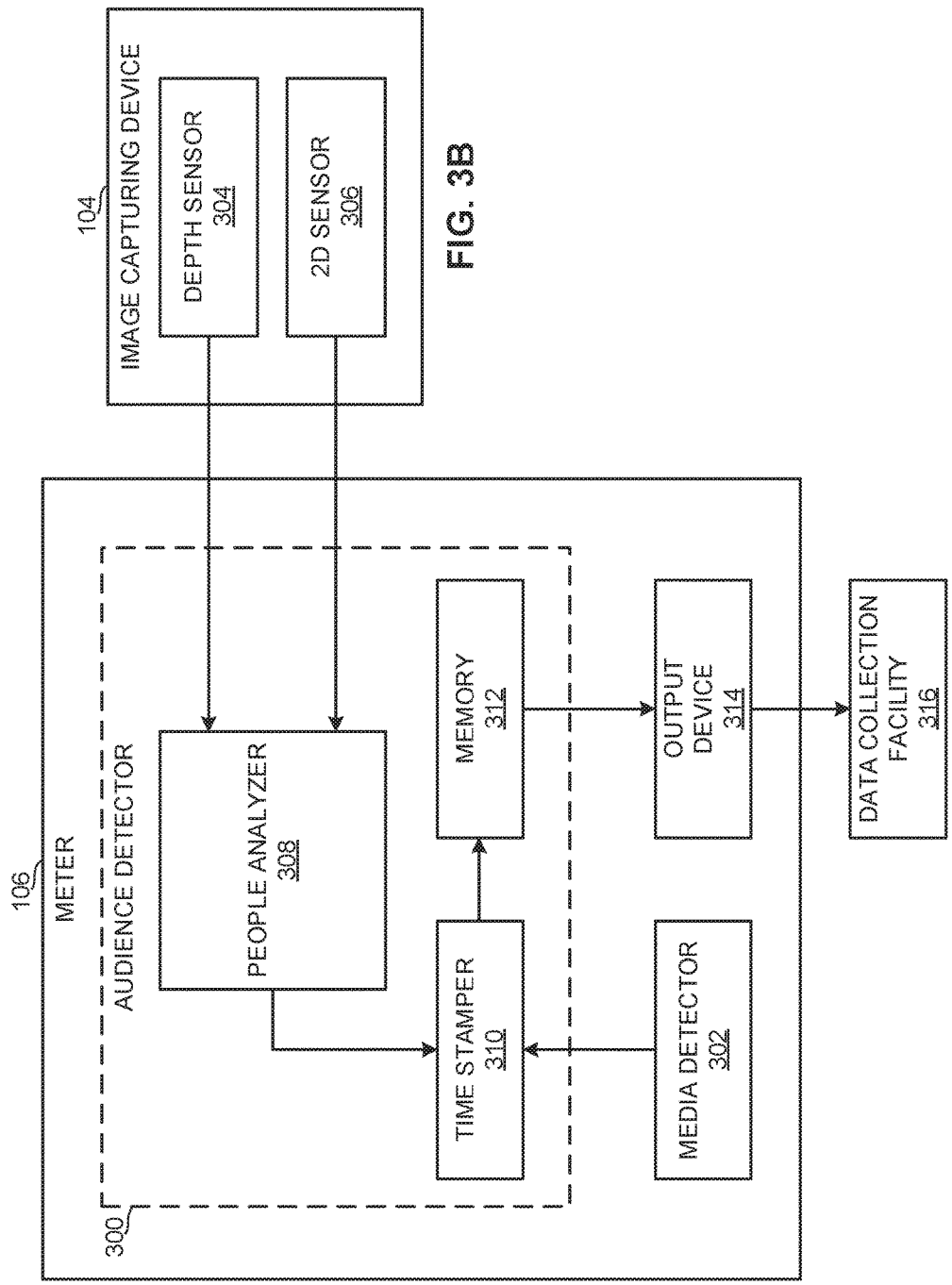
FIG. 3A is a block diagram of an example implementation of the example meter of FIG. 1.
FIG. 3B is a block diagram of an example implementation of the example image capturing device of FIGS. 1 and/or 2.

FIG. 3A illustrates an example implementation of the meter 106 of FIG. 1. FIG. 3B illustrates an example implementation of the image capturing device 104 of FIG. 1. The example meter 106 of FIG. 3A includes an audience detector 300 to develop audience composition information regarding, for example, presence of people in the example environment 100 of FIG. 1. The example meter 106 of FIG. 3A also includes a media detector 302 to collect information regarding, for example, media presented in the environment 100 of FIG. 1. The example media detector 302 is discussed further below. The example image capturing device 104 of FIG. 3B includes a depth sensor 304 capable of capturing distances of objects from the image capturing device 104 at different coordinates within the environment 100. The example depth sensor 304 is also referred to herein as a three-dimensional sensor. The example image capturing device 104 of FIG. 3B also includes a two-dimensional sensor 306 capable of capturing visual data representative of the environment 100. While the example image capturing device 104 of FIG. 3B includes the depth sensor 304 and the two-dimensional sensor 306, the example meter 106 may additionally or alternatively receive three-dimensional data and/or two-dimensional data representative of the environment 100 from a different source. For example, the image capturing device 104 may include the two-dimensional sensor 306 and may receive three-dimensional data representative of the environment 100 from a three-dimensional sensor implemented by a different component in communication with the example meter 106 such as, for example, a video game system (e.g., Microsoft® Kinect®) owned by the panelist. In some examples, the image capturing device 104 is implemented by a Kinnect® sensor which includes both the two-dimensional sensor 306 and the depth sensor 304.

The example depth sensor 304 of FIG. 3B projects an array or grid of dots (e.g., via one or more electromagnetic radiation beams) onto objects of the environment 100. The dots of the array projected by the example depth sensor 304 have respective x-axis coordinates and y-axis coordinates and/or some derivation thereof. The example depth sensor 304 of FIG. 3B uses feedback received in connection with the dot array to calculate depth values associated with different dots projected onto the environment 100. Thus, the example depth sensor 304 generates a plurality of data points. Each such data point has a first component representative of an x-axis position in the environment 100, a second component representative of a y-axis position in the environment 100, and a third component representative of a z-axis position in the environment 100. In the illustrated example, the array projected onto the environment 100 is an infrared array. The example image capturing device 104 of FIG. 3B may utilize additional or alternative type(s) of three-dimensional sensor(s) to capture three-dimensional data representative of the environment 100 such as, for example, image capturing devices employing structured lighting, time-of-flight of light, and/or stereo cameras.

The example two-dimensional sensor 306 of FIG. 3B is implemented by a sensor and/or camera that captures two-dimensional image data representative of the environment 100. In some examples, the two-dimensional sensor 306 includes an infrared imager, a complimentary metal-oxide semiconductor (CMOS) camera, and/or a charge coupled device (CCD) camera. In some examples, the depth sensor 304 and/or the two-dimensional sensor 306 only capture data when the information presentation device 102 is in an "on" state and/or when the media detector 302 determines that media is being presented in the environment 100 of FIG. 1.

The example audience detector 300 of FIG. 3A includes a people analyzer 308, a time stamper 310 and a memory 312. In the illustrated example of FIG. 3A, the data generated by the example depth sensor 304 and/or the example two-dimensional sensor 306 is conveyed to the example people analyzer 308. The example people analyzer 308 of FIG. 3A calculates a people count corresponding to a configurable time period (e.g., one minute intervals, thirty second intervals, etc.) for the example environment 100 of FIG. 1. In some examples, the people analyzer 308 of FIG. 3A determines identities of detected people using, for example, any suitable facial recognition technique and/or application. In some examples, the people analyzer 308 of FIG. 3A detects and/or identifies gestures made by people in the environment 100. Gestures made by people in the environment 100 correspond to, for example, a feedback input to provide an opinion on media being presented on the information presentation device 102. Alternatively, gestures made by people in the environment 100 may correspond to an instruction for the information presentation device 102 and/or the video game system 108. In some examples, the people analyzer 308 communicates with the video game system 108 to utilize the gesture detection capabilities of the video game system 108. An example implementation of the people analyzer 308 of FIG. 3 is described below in connection with FIG. 4.

The example people analyzer 308 of FIG. 3A outputs, for example, calculated people counts or tallies to the example time stamper 310. The time stamper 310 of the illustrated example includes a clock and a calendar. The example time stamper 310 associates a time period (e.g., 1:00 a.m. Central Standard Time (CST) to 1:01 am. CST) and date (e.g., Jan. 1, 2013) with each calculated people count by, for example, appending the period of time and date information to an end of the people data. In some examples, the time stamper 310 applies a single time and date rather than a period of time. A data package (e.g., the people count, the time stamp, the image data, etc.) is stored in the memory 312.

The example memory 312 of FIG. 3A may include a volatile memory (e.g., Synchronous Dynamic Random Access Memory (SDRAM), Dynamic Random Access Memory (DRAM), RAMBUS Dynamic Random Access Memory (RDRAM, etc.) and/or a non-volatile memory (e.g., flash memory). The example memory 312 of FIG. 3A may also include one or more mass storage devices such as, for example, hard drive disk(s), compact disk drive(s), digital versatile disk drive(s), etc. When the example meter 106 is integrated into, for example, the video game system 108 of FIG. 1, the meter 106 may utilize memory of the video game system 108 to store information such as, for example, the people counts, the image data, etc.

The example time stamper 310 of FIG. 3A also receives data from the example media detector 302. The example media detector 302 of FIG. 3A detects presentation(s) of media in the media exposure environment 100 and/or collects identification information associated with the detected presentation(s). For example, the media detector 302, which may be in wired and/or wireless communication with the information presentation device 102 (e.g., a television), the video game system 108, an STB associated with the information presentation device 102, and/or any other component of FIG. 1, can identify a presentation time and/or a source of a presentation. The presentation time and the source identification data may be utilized to identify the program by, for example, cross-referencing a program guide configured, for example, as a look up table. In such instances, the source identification data is, for example, the identity of a channel (e.g., obtained by monitoring a tuner of an STB or a digital selection made via a remote control signal) currently being presented on the information presentation device 102.

Additionally or alternatively, the example media detector 302 of FIG. 3A can identify the presentation by detecting codes and/or watermarks embedded with or otherwise conveyed (e.g., broadcast) with media being presented via an STB and/or the information presentation device 102. As used herein, a code is an identifier that is transmitted with the media for the purpose of identifying (e.g., an audience measurement code) and/or for tuning to (e.g., a packet identifier (PID) header and/or other data used to tune or select packets in a multiplexed stream of packets) the corresponding media. Codes may be carried in the audio, in the video, in metadata, in a vertical blanking interval, in a program guide, in content data, or in any other portion of the media and/or the signal carrying the media. In the illustrated example, the media detector 302 extracts the code(s) from the media. In other examples, the media detector 302 may collect samples of the media and export the samples to a remote site for detection of the code(s).

Additionally or alternatively, the example media detector 302 of FIG. 3A can collect a signature representative of a portion of the media. As used herein, a signature is a representation of a characteristic of the signal carrying or representing one or more aspects of the media (e.g., a frequency spectrum of an audio signal). Signatures may be thought of as fingerprints of the media. Collected signature(s) can be compared against a collection of reference signatures of known media (e.g., content and/or advertisements) to identify tuned media. In some examples, the signature(s) are generated by the media detector 302. Additionally or alternatively, the example media detector 302 collects samples of the media and exports the samples to a remote site for generation of the signature(s). In the example of FIG. 3A, irrespective of the manner in which the media of the presentation is identified (e.g., based on tuning data, metadata, codes, watermarks, and/or signatures), the media identification information is time stamped by the time stamper 310 and stored in the memory 312.

In the illustrated example of FIG. 3A, an output device 314 periodically and/or aperiodically exports the audience identification information and/or the media identification information from the memory 312 to a data collection facility 316 via a network (e.g., a local-area network, a wide-area network, a metropolitan-area network, the Internet, a digital subscriber line (DSL) network, a cable network, a power line network, a wireless communication network, a wireless mobile phone network, a Wi-Fi network, etc.). In some examples, the example meter 106 utilizes the communication capabilities (e.g., network connections) of the video game system 108 to convey information to, for example, the data collection facility 316. In the illustrated example of FIG. 3A, the data collection facility 316 is managed and/or owned by an audience measurement entity (e.g., The Nielsen Company (US), LLC). The audience measurement entity associated with the example data collection facility 316 of FIG. 3A utilizes the people tallies generated by the people analyzer 308 in conjunction with the media identifying data collected by the media detector 302 to generate exposure information. The information from many panelist locations may be collected and analyzed to generate ratings representative of media exposure by one or more populations of interest.

For clarity of illustration, internal connectors within some of the structure and/or circuitry of FIG. 3 are omitted. However, appropriate connectors, busses, and/or other means of communication are provided throughout FIG. 3 to enable transfer of data and/or cooperation between components. In some examples, communication is achieved by writing data to a mutually accessible memory.

While an example manner of implementing the meter 106 of FIG. 1 is illustrated in FIG. 3A, one or more of the elements, processes and/or devices illustrated in FIG. 3A may be combined, divided, re-arranged, omitted, eliminated and/or implemented in any other way. Further, the example audience detector 300, the example media detector 302, the example people analyzer 308, the example time stamper 310 and/or, more generally, the example meter 106 of FIG. 3A may be implemented by hardware, software, firmware and/ or any combination of hardware, software and/or firmware. Thus, for example, any of the example audience detector 300, the example media detector 302, the example people analyzer 308, the example time stamper 310 and/or, more generally, the example meter 106 of FIG. 3A could be implemented by one or more circuit(s), programmable processor(s), application specific integrated circuit(s) (ASIC(s)), programmable logic device(s) (PLD(s)) and/or field programmable logic device(s) (FPLD(s)), etc. When reading any of the apparatus or system claims of this patent to cover a purely software and/or firmware implementation, at least one of the example audience detector 300, the example media detector 302, the example people analyzer 308, the example time stamper 310 and/or, more generally, the example meter 106 of FIG. 3A are hereby expressly defined to include a tangible computer readable storage device or storage disc such as a memory, DVD, CD, Blu-ray, etc. storing the software and/or firmware. Further still, the example meter 106 of FIG. 3A may include one or more elements, processes and/or devices in addition to, or instead of, those illustrated in FIG. 3A, and/or may include more than one of any or all of the illustrated elements, processes and devices.

Figure 4:
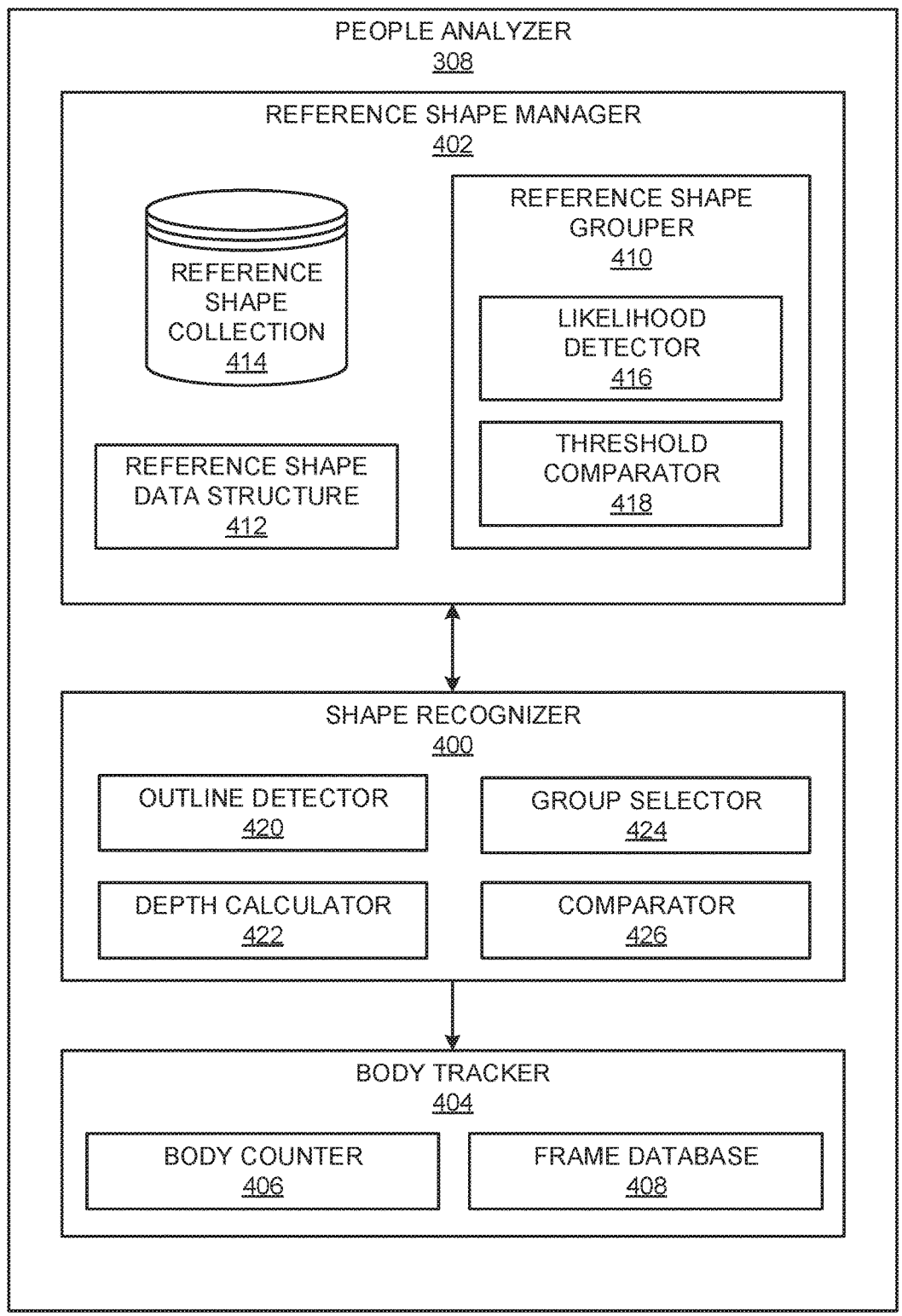
FIG. 4 is a block diagram of an example implementation of the example people analyzer of FIG. 3A.

FIG. 4 illustrates an example implementation of the example people analyzer 308 of FIG. 3A. The example people analyzer 308 of FIG. 4 generates a people count or tally representative of a number of people in the media exposure environment 100 of FIG. 1 for frame(s) of captured image data. The rate at which the example people analyzer 308 of FIG. 4 generates people counts is configurable. In the illustrated example of FIG. 4, the example people analyzer 308 instructs the example image capturing device 104 to capture image data representative of the environment 100 every five seconds. However, the example people analyzer 308 can capture and/or analyze data at any suitable rate. As described in detail below, the example people analyzer 308 of FIG. 4 includes a shape recognizer 400 to determine whether objects of the environment 100 correspond to certain objects (e.g., a person) and/or behaviors (e.g., activity of a person), by comparing image data to reference shapes of a data structure generated and/or maintained by a reference shape manager 402. The example shape recognizer 400 and the example reference shape manager 402 are described further below. The example people analyzer 308 of FIG. 4 also includes a body tracker 404 to store information generated by the shape recognizer 402 and information related thereto. The example body tracker 404 of FIG. 4 includes a body counter 406 to maintain a tally of people currently in the environment 100 and a frame database 408 to store the tally and/or information associated with the tally, such as the two-dimensional and/or three-dimensional data of the frames.

In the illustrated example of FIG. 4, the reference shape manager 402 includes a reference shape grouper 410 to generate a reference shape data structure 412 based on a reference shape collection 414. The example reference shape collection 414 includes a plurality of reference shapes, each of which is known to correspond to an object (e.g., a person, a part of person, etc.) or a combination of objects (e.g., a person and a couch, a part of a person and a part of couch, etc.). Additionally or alternatively, the example reference shapes may be known to correspond to certain gestures, behavior(s) and/or activities taken by a person. The example reference shape collection 414 of FIG. 4 is generated via any suitable technique, such as lab testing, sampling of known images, and/or any suitable type of research and/or development. The example reference shape collection 414 of FIG. 4 is periodically and/or aperiodically updated to reflect changes (e.g., additions, modifications, and/or deletions) to the reference shapes thereof. In some examples, an entity associated with the meter 106 and/or the data collection facility 316 of FIG. 3A manages and/or updates the reference shape collection 414.

While the example reference shape manager 402 of FIG. 4 uses the example reference shape grouper 410 to generate the example reference shape data structure 412 of FIG. 4, additional or alternative data structures can be utilized to group and organize the reference shapes of the collection 414. An example implementation of the reference shape data structure 412 is shown in FIG. 5. The example reference shape data structure 412 of FIGS. 4 and/or 5 includes a plurality of reference shape groups 500-538, each of which has one or more reference shapes of the collection 414 assigned thereto. Each of the groups 500-538 is associated with a type of shape and a range of distances at which the reference shape(s) of the group 500-538 are likely to be detected. In the example data structure 412 of FIG. 5, the type of shape associated with the groups 500-58 is listed in a type of shape column 540. In the example data structure 412 of FIG. 5, the range of distances associated with the groups 500-538 is listed in a distance column 542. The example reference shape grouper 410 of FIG. 4 includes a likelihood detector 416 and a threshold comparator 418 to assign reference shapes of the collection 414 to one or more of the groups 500-538 based on the depth value(s) at which the respective reference shapes are likely to be found. Thus, each of the groups 500-538 of the example data structure 412 of FIGS. 4 and/or 5 includes one or more reference shapes that are likely to be detected in the environment 100 at a particular distance and/or range of distances from the image capturing device 104.

To populate a first group 500 of the example data structure 412 associated with a first type of reference shape 544 (a standing person) and a first depth range 546 (0.5-3.0 feet), the example reference shape grouper 410 identifies reference shape(s) of the collection 414 known to correspond to the first type of shape 544. The example likelihood detector 416 determines a likelihood of detection for each of the identified reference shapes of the first type 544 at the first depth range 546. In some examples, the likelihood detector 416 calculates the likelihood of detection based on, for example, a reference shape size (e.g., as measured by area and/or linear length of the corresponding outline). In the illustrated example of FIG. 4, the likelihood detector 416 assigns higher likelihoods of detection to larger reference shapes for the first depth range 546 because the first depth range 546 is relatively close to the image capturing device 104. In the illustrated example of FIG. 4, the likelihood detector 416 assigns lower likelihoods of detection to smaller reference shapes for the first depth range 546. For a second depth range 548 including distances greater than the distance of the first depth range 546, the example likelihood detector 416 assigns higher likelihoods of detection to smaller reference shapes because the second depth range is relatively far from the image capturing device 104. In the example of FIG. 4, the likelihood detector 416 assigns lower likelihoods of detection to larger reference shapes for the second depth range 548.

In some examples, the likelihoods of detection for the reference shapes at different distances are previously assigned to the reference shapes of the collection 414 and the example likelihood detector 416 of FIG. 4 retrieves the likelihoods from the collection 414. In some examples, the likelihoods of detection for individual ones of the reference shapes are continuously developed over time according to, for example, a Bayesian learning network. In such instances, the example likelihood detector 416 updates the likelihoods of detection for the reference shapes as more information is collected such as, for example, confirmed detections and/or false detections.

The example reference shape grouper 410 utilizes the example threshold comparator 418 to maintain one or more threshold likelihoods to which the likelihoods obtained by the likelihood detector 416 are compared. In some examples, the threshold comparator 418 uses a universal threshold likelihood for comparison with likelihoods of detection obtained by the likelihood detector 416. A universal threshold likelihood is one that is used across different ones (e.g., all) of the depth ranges 542. In some examples, the threshold comparator 418 designates different threshold likelihoods for the different depth ranges 542. The example threshold comparator 418 identifies which of the reference shapes have a likelihood of detection greater than the corresponding (e.g., universal or designated) threshold likelihood. The example reference shape grouper 410 of FIG. 4 assigns such reference shape(s) identified by the threshold comparator 418 to the corresponding one of the groups 500-538. For example, a first reference shape of the first type 544 of the collection 414 has a first likelihood of detection at the first depth range 546 and second likelihood of detection at the second depth range 548. If the threshold comparator 418 determines that the first likelihood of detection of the first reference shape is greater than the threshold likelihood, the example reference shape grouper 410 of FIG. 4 assigns the first reference shape to the first group 500. If the threshold comparator 418 determines that the second likelihood of detection of the first reference shape is greater than the threshold likelihood, the example reference shape grouper 410 of FIG. 4 assigns the first reference shape to a second one of the groups 506 corresponding to the second depth range 548. In some examples, the reference shape grouper 410 of FIG. 4 assigns the first reference shape of the collection 414 to the first group 500 and the second when the first and second likelihoods of detection are greater than the threshold likelihood.

Accordingly, the first group 500 of the example data structure 412 associated with the first depth range 546 is populated with the reference shapes of the first type 544 of the collection 414 having a likelihood of detection at the first depth range 546 (e.g., as determined by the likelihood detector 416) greater than the threshold likelihood (e.g., as determined by the threshold comparator 418). Additionally, the second group 506 of the example data structure 412 associated with the second depth range 548 is populated with reference shapes of the first type 544 of the collection 414 having a likelihood of detection (e.g., as determined by the likelihood detector 416) at the second depth range 548 greater than the threshold likelihood (e.g., as determined by the threshold comparator 418). The example reference shape grouper 410 of FIG. 4 populates other ones of the groups 500-538 in a similar manner.

When the example reference shape grouper 410 of FIG. 4 has assigned the reference shapes of the collection 414 to the groups 500-538, an instance of the reference shape data structure 412 is stored. Thus, the example reference shape data structure 412 of FIG. 4 includes a plurality of reference shape groupings 500-538, each of which includes reference shape(s) that are likely detected at a distance associated with the corresponding group 500-538. As described below, the example shape recognizer 400 of FIG. 4 uses the example reference shape data structure 412 to select one of the reference shape groups 500-538 for comparison to image data (e.g., an object outline).

The example shape recognizer 400 of FIG. 4 receives and/or otherwise obtains image data from the image capturing device 104. In the illustrated example, the image data provided by the image capturing device 104 includes a depth value provided by the depth sensor 304 of FIG. 3B for respective X-Y coordinates of the environment 100. In the illustrated example, the image data also includes visual two-dimensional data provided by the two-dimensional sensor 306 of FIG. 3B. The example shape recognizer 400 of FIG. 4 includes an outline detector 420 to analyze the two-dimensional and/or three-dimensional data. In particular, the example outline detector 420 of FIG. 4 identifies portion(s) of the image data that correspond to an outline of an object and/or a combination of objects in the environment 100. In some instances, the term "object outline" refers to an outline of a single object. In some instances, the term "object outline" refers to an outline of a combination of two or more objects. For example, a first object outline detected by the example outline detector 420 of FIG. 4 corresponds to a human body standing in the environment 100 facing the image capturing device 104 (e.g., the first person 110 of FIG. 1). A second example object outline detected by the example outline detector 420 of FIG. 4 corresponds to a side profile of a head and shoulders of a person in combination with a couch (or a portion of the couch) on which the person is sitting (e.g., the second person 112 of FIG. 1). A third example object outline detected by the example outline detector 420 of FIG. 4 corresponds to a front perspective of a torso of a human body in combination with a chair (or a portion of the chair) on which the corresponding person is sitting (e.g., the third person 114 of FIG. 1). The example outline detector 420 of FIG. 4 detects the object outlines by identifying edges in the image data. For example, the outline detector 420 of FIG. 4 identifies neighboring pixels of two-dimensional data having differences (e.g., differences greater than one or more threshold differences) in contrast and/or brightness. Additionally or alternatively, the example outline detector 420 of FIG. 4 identifies neighboring pixels of three-dimensional data having differences (e.g., greater than one or more threshold differences) in depth values. The example outline detector 420 of FIG. 4 detects the object outlines in any additional or alternative manner and/or using any additional or alternative suitable technique involving image characteristic(s) known to correspond to outlines of objects. For example, the outline detector 420 of FIG. 4 may utilize a combination of two-dimensional image data analysis and three-dimensional image data analysis to identify an outline of an object.

Figure 6:
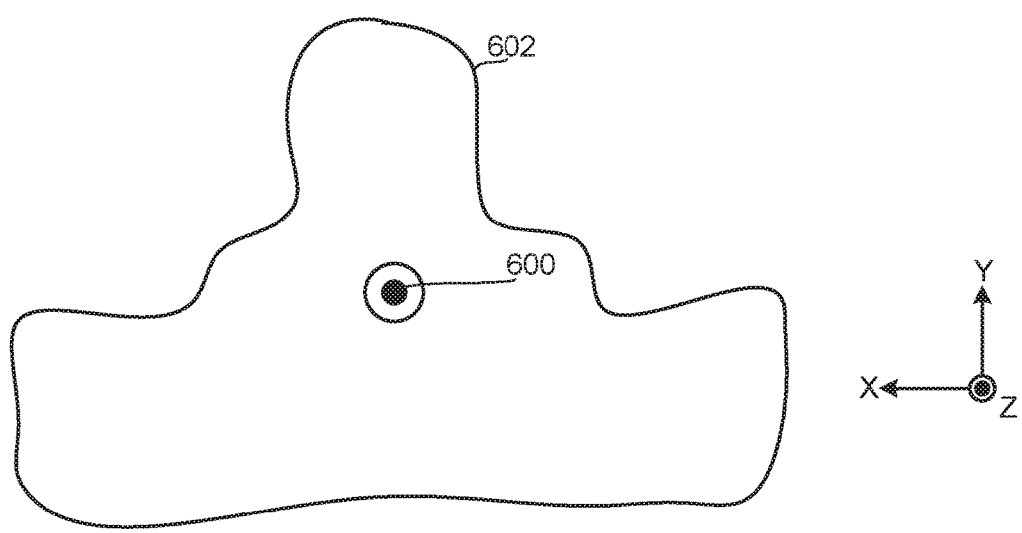
FIG. 6 is an illustration of an example coordinate corresponding to an object outline detected by the example outline detector of FIG. 4.

To define the detected object outline(s), the example outline detector 420 of FIG. 4 records the X-Y coordinates of the areas in the image data corresponding to the object outline(s). In some examples, the outline detector 420 of FIG. 4 records each of the coordinates corresponding to points along the outline. In some examples, the outline detector 420 of FIG. 4 records a marking coordinate(s) associated with, for example, designated point(s) of the detected object outline (e.g., the center of a circle, the center of a semi-circle, the center of a polygon, the top and bottom Y-component coordinates, etc.). FIG. 6 illustrates an example marking coordinate 600 to track an X-Y position of an object outline 602 in the environment 100. In the illustrated example of FIG. 6, the object outline 602 corresponds to a combination of the third person 114 of FIG. 1 and a top portion of the chair on which the third person 114 is sitting. The example object outline 602 of FIG. 6 corresponds to edges detected by the example outline detector 420 in a frame of two-dimensional image data and/or a frame of three-dimensional image data. In the example of FIG. 6, the example marking coordinate 600 is used as a coordinate identifier for the example object outline 602. The example marking coordinate 600 of FIG. 6 corresponds to an approximate center of the polygon formed by the example object outline 602. In some examples, a plurality of X-Y coordinates along the object outline 602 is used as a collective coordinate identifier for the example object outline 602. In such instances, the plurality of X-Y coordinates used as the collective coordinate identifier includes all of the X-Y coordinates corresponding to the detected edges or a subset of those X-Y coordinates.

The coordinate identifier information (e.g., the example marking coordinate 600 of FIG. 6 associated with the detected object outline(s) is conveyed to or otherwise accessed by an example depth calculator 422 of the example shape recognizer 400 of FIG. 4. The example depth calculator 422 of FIG. 4 calculates and/or determines one or more depth values for the object outline(s) detected by the example outline detector 420. In the illustrated example of FIG. 4, the depth calculator 422 determines the depth value for a detected object outline based on the coordinate(s) associated with the detected outline, which is referred to as the coordinate identifier information in the illustrated example. For example, when the example marking coordinate 600 of FIG. 6 is used as the coordinate identifier for the object outline 602, the marking coordinate 600 provides an X-Y value that the example depth calculator 422 of FIG. 4 uses to determine a depth value detected by the depth sensor 304 of FIG. 3B at the corresponding location in the environment 100. In such instances, the example depth calculator 422 of FIG. 4 uses a single coordinate of the detected object outline to determine a depth value for an object and/or combination of objects associated with the detected object outline. In some examples, such as when the coordinate identifier for an object outline includes a plurality of X-Y coordinates, the depth calculator 422 of FIG. 4 uses a plurality of X-Y coordinates to obtain a plurality of corresponding depth values. In such instances, the plurality of depth values includes, for example, depth values (e.g., Z-components) at X-Y coordinates associated with the edges of the outline. In some examples, the depth calculator 422 selects a plurality of X-Y coordinates that fall within the detected object outline and obtains depth values at the selected X-Y coordinates associated with points (e.g., randomly selected points and/or points selected according to a predetermined pattern such as a square or triangle). In some examples, the depth calculator 422 aggregates the plurality of depth values associated with the detected object outline to generate a combined depth value for the object outline. For example, the depth calculator 422 of FIG. 4 averages the plurality of depth values to generate the combined depth value for the object(s) associated with the detected object outline.

The example shape recognizer 400 of FIG. 4 includes a group selector 424 to query the example reference shape data structure 412 generated and/or maintained by the example reference shape manager 402 of FIG. 4. While the example group selector 424 of FIG. 4 queries the example data structure 412 of FIG. 4, the example shape recognizer 400 can utilize any suitable type of query mechanism capable of querying any suitable type of data structure utilized to group and/or organize the reference shapes of the collection 414 (e.g., according to depth information as described above). The example group selector 424 of FIG. 4 queries the data structure 412 using the depth value(s) generated and/or obtained by the example depth calculator 422 of FIG. 4 and a desired type of shape for which the example people analyzer 308 is searching. For example, when the example people analyzer 308 of FIGS. 3A and/or 4 is searching for standing people and the example object outline 602 of FIG. 6 is detected, the example group selector 424 queries the example data structure 412 of FIGS. 4 and/or 5 with the depth value of the marking coordinate 600 and the first type of shape 544 of FIG. 5. If the depth value of the marking coordinate 600 falls in the first depth range 546, the example group selector 424 selects the first group 500. If the depth value of the marking coordinate 600 falls in the second depth range 546, the example group selector 424 selects the second group 506.

In some examples, the people analyzer 308 is searching for more general objects, such as people in general (e.g., as opposed to standing people). In such instances, the example group selector 424 queries the data structure with each shape type corresponding to people, which is likely more than one shape type. For example, when the people analyzer 308 of FIGS. 3A and/or 4 is searching for people and the object outline 602 of FIG. 6 is detected, the example group selector 424 queries the example data structure 412 of FIGS. 4 and/or 5 with the depth value of the marking coordinate 600 and each of the types of shapes in the shape type column 540 of FIG. 5. In some examples, a desired type of shape is not designated by the group selector 424. In such instances, each of the shape types 540 of the data structure 412 is searched. Therefore, when identifying a subset of the reference shape collection 414 for comparison to detected object outlines, the example group selector 424 of FIG. 4 selects one or more of the groups 500-538 to form the subset of reference shapes.

As described above, each of the groups 500-538 of the example data structure 412 of FIG. 5 includes one or more reference shapes of the collection 414 likely to be detected at a particular distance or range of distances from the image capturing device 104. Thus, the example group selector 424 of FIG. 4 uses depth value(s) associated with a detected object outline to select a subset of the reference shapes of the collection 414. The reference shapes selected by the example group selector 424 of FIG. 4 are sometimes referred to herein as candidate reference shapes.

The example shape recognizer 400 of FIG. 4 includes a comparator 426 to compare object outlines detected by the outline detector 420 and the candidate reference shape(s) of the group(s) selected by the group selector 424. For example, when a first subset of reference shapes assigned to the first group 500 is selected by the group selector 424 based on the depth value of the example marking coordinate 600 of FIG. 6, the example comparator 426 compares the example object outline 602 of FIG. 6 to the candidate reference shapes of the first group 500. In the illustrated example of FIG. 4, the comparator 426 determines if a distance transform of the object outline 602 matches (e.g., is substantially similar to) the individual candidate reference shapes. The example comparator 426 of FIG. 4 can utilize any additional or alternative metrics to calculate a similarity between the detected object outline 602 and the reference shape(s). In some examples, the comparator 426 of FIG. 4 compares the object outline 602 to each of the candidate reference shapes. In some examples, the comparator 426 of FIG. 4 compares the object outline 602 to the candidate reference shapes until a match (e.g., within a threshold similarity) is found and then ceases the comparisons, thereby examining only a portion of the candidate reference shapes. When the example comparator 426 of FIG. 4 determines that the detected object outline 602 is sufficiently similar (e.g., within a threshold percentage) of one of the candidate reference shapes, the example shape recognizer 400 stores an indication of the match, the object outline 602, an identifier associated with the matching reference shape, the marking coordinate 600 of the object outline 602, and/or any other suitable information. Further, the example shape recognizer 400 conveys the stored data to the example body tracker 404 and/or the example data collection facility 316 of FIG. 3. When the example people analyzer 308 is searching for people, the example body counter 406 of FIG. 4 increments a person tally or count in response to receiving the indication of the person detection. Additionally, the corresponding frame of image data, the person detection, and the recorded coordinate(s) are stored in the example frame database 408 for purposes of, for example, record keeping, subsequent verification procedures, and/or comparison to other frames (e.g., a subsequent frame to determine if movement has occurred in the environment 100).

For clarity of illustration, internal connectors within some of the structure and/or circuitry of FIG. 4 are omitted. However, it will be understood that appropriate connectors, busses, and/or other means of communication are provided throughout FIG. 4 to enable transfer of data and/or cooperation between components. In some examples, communication is achieved by writing data to a mutually accessible memory.

While an example manner of implementing the people analyzer 308 of FIG. 3A is illustrated in FIG. 4, one or more of the elements, processes and/or devices illustrated in FIG. 4 may be combined, divided, re-arranged, omitted, eliminated and/or implemented in any other way. Further, the example shape recognizer 400, the example reference shape manager 402, the example body tracker 404, the example body counter 406, the example reference shape grouper 410, the example likelihood detector 416, the example threshold comparator 418, the example outline detector 420, the example depth calculator 422, the example group selector 424, the example comparator 426 and/or, more generally, the example people analyzer 308 of FIG. 4 may be implemented by hardware, software, firmware and/or any combination of hardware, software and/or firmware. Thus, for example, any of the example shape recognizer 400, the example reference shape manager 402, the example body tracker 404, the example body counter 406, the example reference shape grouper 410, the example likelihood detector 416, the example threshold comparator 418, the example outline detector 420, the example depth calculator 422, the example group selector 424, the example comparator 426 and/or, more generally, the example people analyzer 308 of FIG. 4 could be implemented by one or more circuit(s), programmable processor(s), application specific integrated circuit(s) (ASIC(s)), programmable logic device(s) (PLD(s)) and/or field programmable logic device(s) (FPLD(s)), etc. When reading any of the apparatus or system claims of this patent to cover a purely software and/or firmware implementation, at least one of the example shape recognizer 400, the example reference shape manager 402, the example body tracker 404, the example body counter 406, the example reference shape grouper 410, the example likelihood detector 416, the example threshold comparator 418, the example outline detector 420, the example depth calculator 422, the example group selector 424, the example comparator 426 and/or, more generally, the example people analyzer 308 of FIG. 4 are hereby expressly defined to include a tangible computer readable storage device or storage disc such as a memory, DVD, CD, Blu-ray, etc. storing the software and/or firmware. Further still, the example people analyzer 308 of FIG. 3 may include one or more elements, processes and/or devices in addition to, or instead of, those illustrated in FIG. 4, and/or may include more than one of any or all of the illustrated elements, processes and devices.

Figure 7:
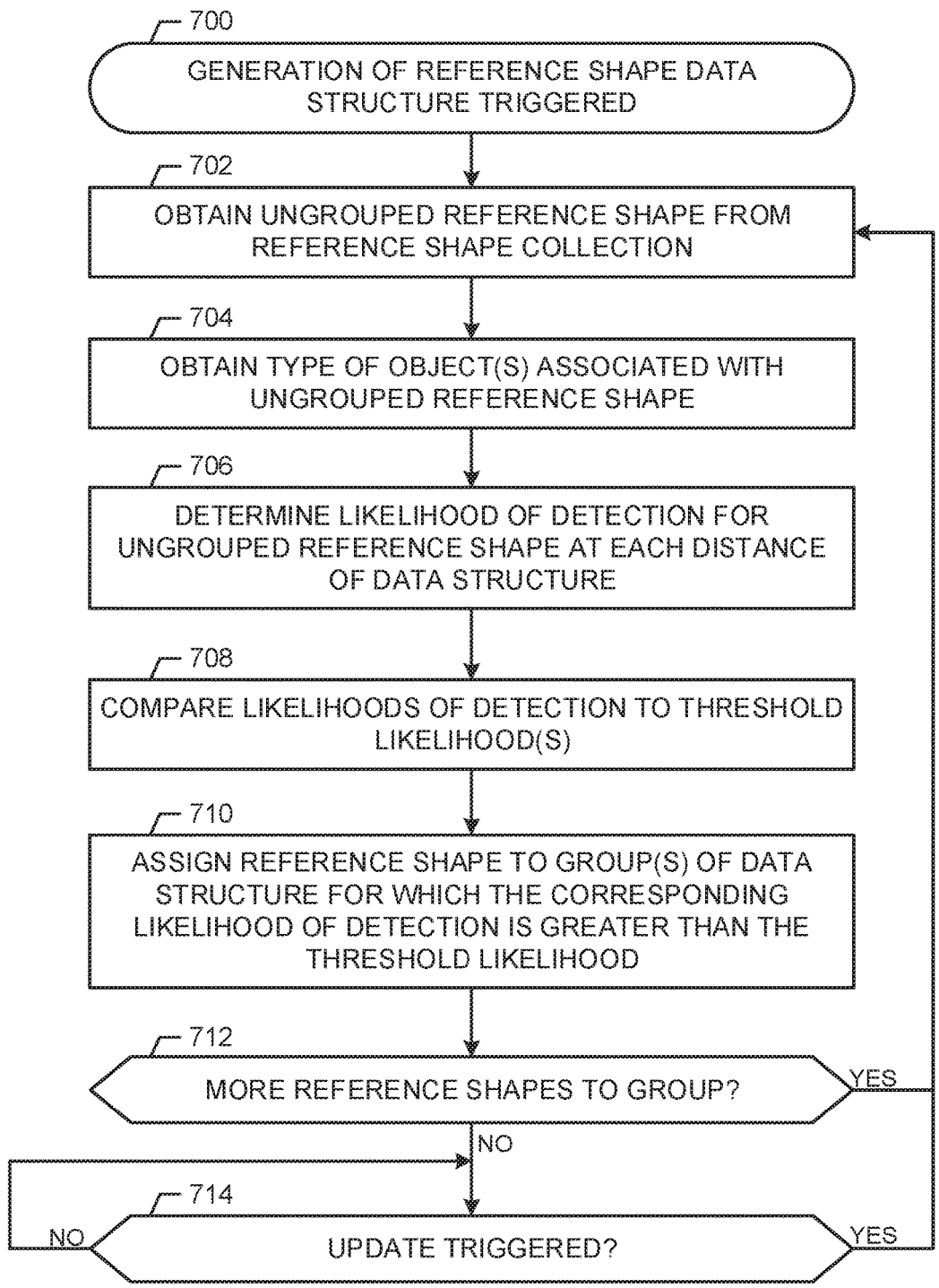
FIGS. 7-8 are flowcharts representative of example machine readable instructions that may be executed to implement the example people analyzer of FIGS. 3A and/or 4.
Figure 8:
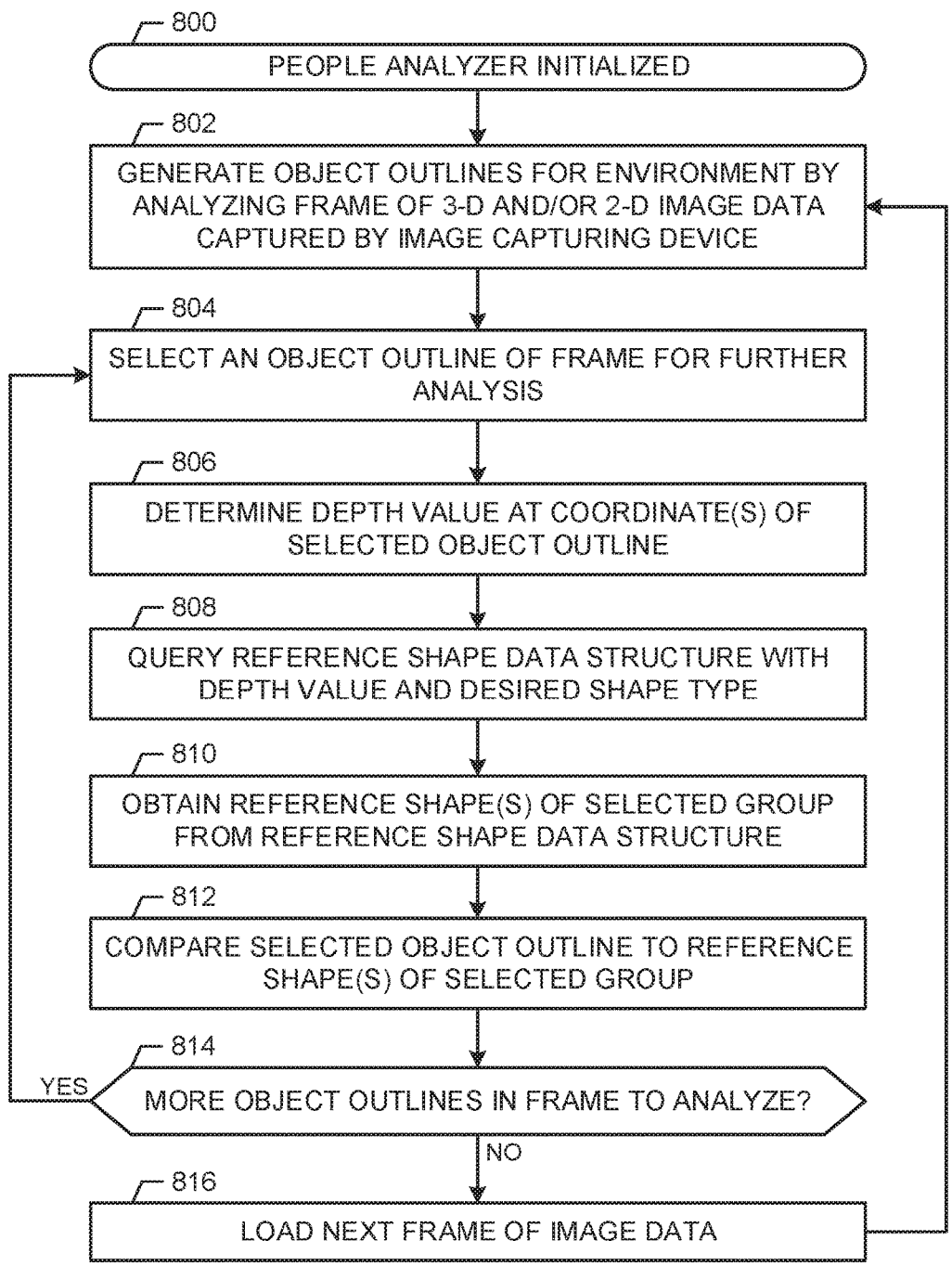

Flowchart representative of example machine readable instructions for implementing the people analyzer 308 of FIGS. 3A and/or 4 are shown in FIGS. 7 and 8. In these examples, the machine readable instructions comprise programs for execution by a processor such as the processor 912 shown in the example processor platform 900 discussed below in connection with FIG. 9. The programs may be embodied in software stored on a tangible computer readable storage medium such as a CD-ROM, a floppy disk, a hard drive, a digital versatile disk (DVD), a Blu-ray disk, or a memory associated with the processor 912, but the entire programs and/or parts thereof could alternatively be executed by a device other than the processor 912 and/or embodied in firmware or dedicated hardware. Further, although the example programs are described with reference to the flowcharts illustrated in FIGS. 7 and 8, many other methods of implementing the example people analyzer 308 may alternatively be used. For example, the order of execution of the blocks may be changed, and/or some of the blocks described may be changed, eliminated, or combined.

As mentioned above, the example processes of FIGS. 7 and/or 8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 7 and/or 8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disc and to exclude propagating signals. As used herein, when the phrase "at least" is used as the transition term in a preamble of a claim, it is open-ended in the same manner as the term "comprising" is open ended.

FIG. 7 is an example flowchart representative of instructions to generate the example reference shape data structure 412 by, for example, the reference shape grouper 410 of FIG. 4. The example of FIG. 7 begins with the reference shape manager 402 of FIG. 4 being triggered to generate the example reference shape data structure 412 of FIGS. 4 and/or 5 (block 700). The example reference shape manager 402 is triggered in connection with, for example, installation of the example meter 106 of FIGS. 1 and/or 3A at a panelist site. In some examples, the reference shape manager 402 of FIG. 4 bases one or more calculations on the type and/or capabilities of the image capturing device 104. To populate the example reference shape data structure 412, the example reference shape grouper 410 obtains an ungrouped reference shape from the example reference shape collection 414 of FIG. 4 (block 702). An ungrouped reference shape is one that has not yet been assigned to one of the groups of the data structure 412 (e.g., one of the groups 500-538 of FIG. 5). The example reference shape grouper 410 obtains a shape type associated with the ungrouped reference shape (block 704). For example, the reference shape grouper 410 determines that the ungrouped reference shape is known to correspond to a standing person, a head, a chair, a combination of a person and a couch, etc.

The example likelihood detector 416 of FIG. 4 determines a likelihood of detection (e.g., a percentage) for the ungrouped reference shape at each distance and/or range of distances of the example data structure 412 (block 706). As described above, the example likelihood detector 416 determines the likelihoods of detection based on, for example, a size of the reference shape, knowledge of previous detections (e.g., using a Bayesian belief network), direct input from an administrator, and/or any other suitable information. The example threshold comparator 418 of FIG. 4 compares the individual likelihoods of detection for each distance and/or range of distances to a threshold likelihood (e.g., a universal threshold or a threshold designated for the particular distance and/or range of distances) (bock 708). For the distance(s) and/or range(s) of distances of the data structure 412 for which the ungrouped reference shape has a likelihood of detection greater than the threshold likelihood (e.g., as determined by the threshold comparator 418), the example reference shape grouper 410 assigns the ungrouped reference shape to the corresponding one(s) of the groups 500-538 (block 710). Accordingly, the previously ungrouped reference shape of the collection 414 is assigned to one or more of the groups 500-538 of the data structure 412.

If the reference shape collection 414 includes additional ungrouped reference shapes (block 712), another ungrouped reference shape is retrieved and processed (block 702). If not, the example reference shape manager 402 determines whether an update has been triggered (block 714). An update is triggered when, for example, a schedule indicates that an update is due and/or when one or more reference shapes are added to the collection 414. If an update is triggered, an ungrouped reference shape is retrieved and processed (block 702). Otherwise, the example reference shape manager 402 waits for an update (block 714).

FIG. 8 is an example flowchart representative of instructions to monitor, for example, the environment 100 of FIG. 1 using the example people analyzer 308 of FIGS. 3A and/or 4. The initiation of the people analyzer 308 coincides with, for example, activation of the information presentation device 102, the example meter 106, and/or the video game system 108 of FIG. 1 (block 800). As described above, the example people analyzer 308 monitors the environment 100 by analyzing three-dimensional and/or two-dimensional image data representative of the environment 100 captured by the image capturing device 104. In the example of FIG. 8, the outline detector 420 of FIG. 4 analyzes the image data representative of the environment 100 to identify object outlines present in the environment 100 (block 802). For example, the outline detector 420 detects edges of object(s) and/or combination(s) of objects based on contrast, brightness, and/or depth values of the image data. As described above, the example outline detector 420 stores one or more coordinates as a coordinate identifier for each detected object outline in the environment 100.

The example shape recognizer 400 of FIG. 4 selects one of the detected object outlines for analysis to determine if the selected object outline corresponds to one or more of the reference shapes of the data structure 412 of FIG. 4 (block 804). In some examples, the shape recognizer 400 of FIG. 4 selects a largest unanalyzed one of the detected object outline(s) for analysis. However, any suitable selection technique or order can be utilized. The example depth calculator 422 of FIG. 4 obtains depth value(s) associated with the coordinate identifier of the selected object outline (block 806). In the illustrated example, when the coordinate identifier includes more than one depth value, the example depth calculator 422 aggregates and/or combines (e.g., averages) the depth values to form a depth value for querying the data structure 412. The example group selector 424 of FIG. 4 uses the depth value generated and/or obtained by the example depth calculator 422 to query the data structure 412 (block 808). In the example of FIG. 8, the example group selector 424 also uses a shape type provided by, for example, the people analyzer 308, to query the data structure 412 (block 808). Alternatively, when no particular shape type is provided, the example group selector 424 may query the data structure 412 for more than one shape type (e.g., all shape types and/or a subset of shape types).

Querying of the data structure 412 results in the example group selector 424 receiving an indication of which group(s) 500-538 of the data structure 412 corresponds to the depth value and/or shape type (block 810). In the example of FIG. 8, the group selector 424 provides the indication of the group(s) 500-538 to the comparator 426, which obtains the reference shapes of the indicated group(s) (block 810). The example comparator 426 of FIG. 4 compares the obtained candidate reference shapes to the current object outline (e.g., the object outline selected at block 804) (block 812). If the comparator 426 indicates that the object outline is similar (e.g., according to a similarity threshold) to one or more of the candidate reference shapes, the example comparator 426 identifies those candidate reference shapes as corresponding to the detected object outline.

If more object outline(s) were detected in the current frame of image data (block 814), an unanalyzed object outline of the frame is selected for analysis (block 804). Otherwise, the example shape recognizer 400 obtains the next frame of image data representative of the environment 100 (block 816).

Figure 9:
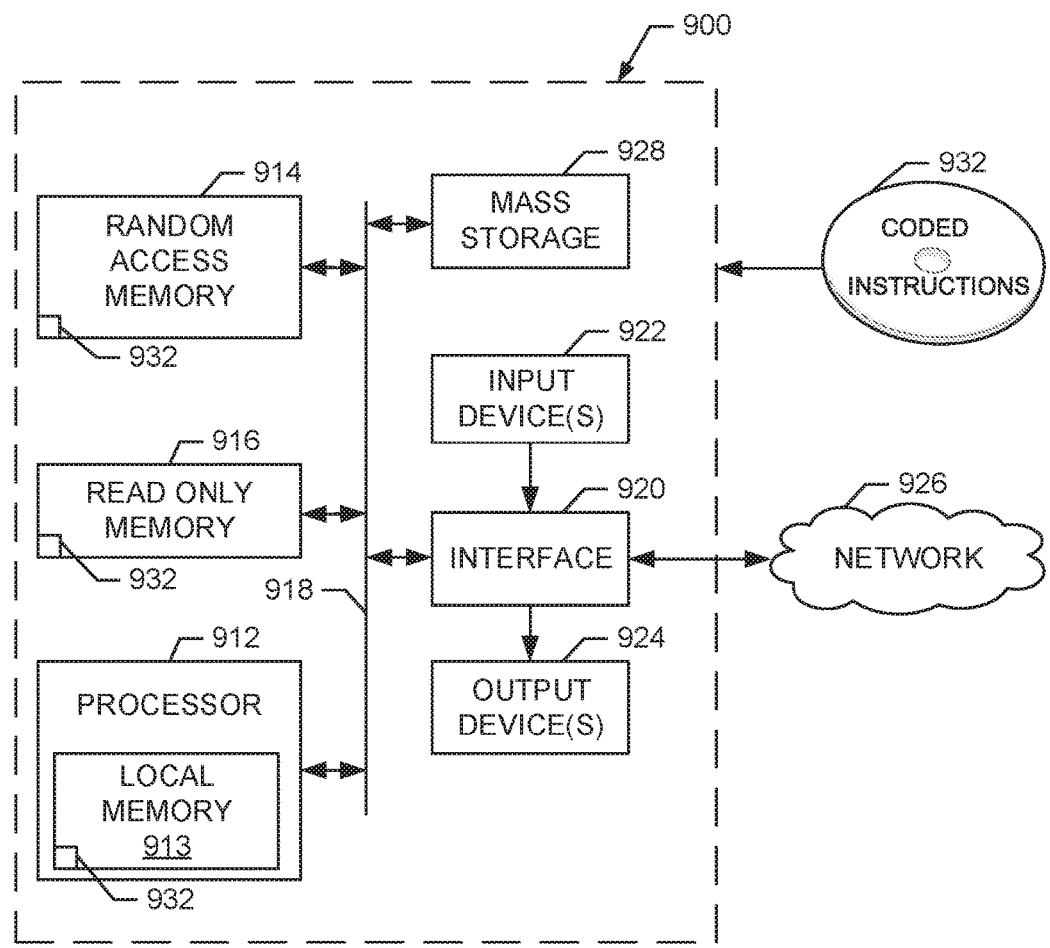
FIG. 9 is a block diagram of an example processing system capable of executing the example machine readable instructions of FIGS. 7 and/or 8 to implement the example people analyzer of FIGS. 3A and/or 4.

FIG. 9 is a block diagram of an example processor platform 900 capable of executing the instructions of FIGS. 7 and/or 8 to implement the people analyzer 308 of FIGS. 3A and/or 4. The processor platform 900 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit a user to enter data and commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 920 of the illustrated example, thus, typically includes a graphics driver card.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 of FIGS. 7 and/or 8 may be stored in the mass storage device 928, in the volatile memory 914, in the non-volatile memory 916, and/or on a removable tangible computer readable storage medium such as a CD or DVD.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. An apparatus to manage a database for object recognition, the apparatus comprising:
    a detector to determine a first likelihood of detection for a reference shape at a first distance from an image capturing device;
    a grouper to store the reference shape in a first group of a plurality of groups of reference shapes in the database based on a comparison of the first likelihood of detection with a first threshold, the first group associated with the first distance;
    a calculator to aggregate a plurality of depth values associated with an object outline in an image to determine a combined depth value associated with the detected object outline; and
    a comparator to limit comparison of the object outline in the image to reference shapes of the first group responsive to the combined depth value corresponding to the first distance.

2. The apparatus of claim 1, wherein the detector is to determine a second likelihood of detection for the reference shape at a second distance from the image capturing device different than the first distance, and the grouper is to store the reference shape in a second group of the plurality of groups when the second likelihood of detection is greater than a second threshold, the second group associated with the second distance.

3. The apparatus of claim 1, wherein respective ones of the plurality of groups in the database are associated with respective different distances from the image capturing device, and the grouper is to store the reference shape in ones of the plurality of groups in the database based on comparisons of respective likelihoods of detection at the respective distances with respective thresholds associated with the respective distances, a first one of the respective thresholds different than a second one of the respective thresholds.

4. The apparatus of claim 1, wherein the grouper is to determine a type of the reference shape, and the first group is also associated with the type of the reference shape.

5. The apparatus of claim 4, wherein the type of the reference shape includes at least one of a standing person, a head, a chair, and a combination of a person and a couch.

6. The apparatus of claim 1, wherein the detector is to determine the first likelihood of detection based on at least one of a size of the reference shape or input from an administrator.

7. The apparatus of claim 1, wherein the detector is to determine the first likelihood of detection based on a Bayesian network.

8. A tangible machine readable storage medium comprising instructions that, when executed, cause a processor to at least:
    determine a first likelihood of detection for a reference shape at a first distance from an image capturing device;
    store the reference shape in a first group of a plurality of groups of reference shapes in a database based on a comparison of the first likelihood of detection with a first threshold, the first group associated with the first distance;
    aggregate a plurality of depth values associated with an object outline in an image to determine a combined depth value associated with the detected object outline; and
    limit comparison of the object outline in the image to reference shapes of the first group responsive to the combined depth value corresponding to the first distance.

9. The storage medium of claim 8, where in the instruction further cause the processor to determine a second likelihood of detection for the reference shape at a second distance from the image capturing device different than the first distance, and store the reference shape in a second group of the plurality of groups when the second likelihood of detection is greater than a second threshold, the second group associated with the second distance.

10. The storage medium of claim 8, wherein respective ones of the plurality of groups in the database are associated with respective different distances from the image capturing device, and the instructions further cause the processor to store the reference shape in ones of the plurality of groups in the database based on comparisons of respective likelihoods of detection at the respective distances with respective thresholds associated with respective distances, a first one of the respective thresholds different than a second one of the respective thresholds.

11. The storage medium of claim 8, wherein the instructions further cause the processor to determine a type of the reference shape, and the first group is also associated with the type of the reference shape.

12. The storage medium of claim 11, wherein the type of the reference shape includes at least one of a standing person, a head, a chair, and a combination of a person and a couch.

13. The storage medium of claim 8, wherein the instructions further cause the processor to determine the first likelihood of detection based on at least one of a size of the reference shape or input from an administrator.

14. The storage medium of claim 8, wherein the instructions further cause the processor to determine the first likelihood of detection based on a Bayesian network.

15. A method comprising:
  determining, by executing an instruction with a processor, a first likelihood of detection for a reference shape at a first distance from an image capturing device;
  storing the reference shape in a first group of a plurality of groups of reference shapes in a database based on a comparison of the first likelihood of detection with a first threshold, the first group associated with the first distance;
  aggregating, by executing an instruction with the processor, a plurality of depth values associated with an object outline in an image to determine a combined depth value associated with the detected object outline; and
  limiting comparison of the object outline in the image to reference shapes of the first group responsive to the combined depth value corresponding to the first distance.

16. The method of claim 15, further including determining a second likelihood of detection for the reference shape at a second distance from the image capturing device different than the first distance, and store the reference shape in a second group of the plurality of groups when the second likelihood of detection is greater than a second threshold, the second group associated with the second distance.

17. The method of claim 15, further including determining a type of the reference shape and associating the first group with the type of the reference shape.

18. The method of claim 17, wherein the type of the reference shapes includes at least one of a standing person, a head, a chair, and a combination of a person and a couch.

19. The method of claim 15, further including determining the first likelihood of detection based on at least one of a size of the reference shape or input from an administrator.

20. The method of claim 15, further including determining the first likelihood of detection based on a Bayesian network.

* * * * *